United States Patent [19]

Cammilleri

[11] 4,074,322
[45] Feb. 14, 1978

[54] TELEVISION PROJECTOR

[75] Inventor: Angelo M. Cammilleri, Williamsville, N.Y.

[73] Assignee: Telejector Ltd., Cheektowaga, N.Y.

[21] Appl. No.: 761,950

[22] Filed: Jan. 24, 1977

[51] Int. Cl.² .................... H04N 5/74; G02B 5/136; G02B 27/18

[52] U.S. Cl. .................. 358/237; 350/297; 358/250

[58] Field of Search ............ 358/250, 237, 231; 350/297

[56] References Cited

U.S. PATENT DOCUMENTS

| | | | |
|---|---|---|---|
| 2,250,174 | 7/1941 | Bancroft | 350/297 |
| 2,260,228 | 10/1941 | Möller | 358/237 |
| 2,531,974 | 11/1950 | Ellett | 350/297 |
| 2,566,830 | 9/1951 | Goldsmith | 358/250 |
| 2,706,930 | 4/1955 | Jansen | 358/250 |
| 3,525,807 | 8/1970 | Herriott | 358/237 |
| 3,800,085 | 3/1974 | Ambats | 358/250 |

Primary Examiner—Howard W. Britton
Attorney, Agent, or Firm—Christel & Bean

[57] ABSTRACT

Television picture image projecting apparatus removably attached to a standard television receiver and including a housing having an image entrance opening adjacent the receiving screen, a Fresnel lens in the housing for enlarging the received image, and a mirror combination in the housing including two plane reflecting mirrors joined together with the reflecting surfaces defining an included angle of ninety degrees for inverting a received image. The mirror combination is located optically between the lens and an image exit opening adjacent the other end of the housing, and the resulting image is projected on a planar viewing surface such as a standard projector screen in a forward projection mode. In another aspect, a plane reflecting mirror is located optically between the lens and mirror combination, and the resulting image is projected on one surface of a translucent screen for viewing from the opposite surface in a rear projection mode. In another aspect, a plane reflecting mirror is located optically between the television screen and the lens, and the resulting image is projected on a viewing surface in a forward projection mode.

9 Claims, 11 Drawing Figures

TELEVISION PROJECTOR

BACKGROUND OF THE INVENTION

This invention relates to the art of projection optics, and more particularly to a new and improved apparatus for projecting a television image onto a screen.

Apparatus for projecting an enlarged image from a standard television picture screen onto a large viewing screen, finds use in both the home and commercial establishments. In addition to satisfying optical requirements by providing a projected image of high quality, such apparatus should be relatively simple in construction and economical to manufacture as well as being convenient and easy to operate and maintain.

SUMMARY OF THE INVENTION

It is, therefore, a principal object of this invention to provide a new and improved optical image projecting apparatus for use with standard television receivers.

It is a further object of this invention to provide such apparatus which converts the television image into a projected image of high optical quality.

It is a further object of this invention to provide such apparatus which is convenient and easy to install on a standard television receiver and which is readily removable therefrom.

It is a further object of this invention to provide such apparatus which is relatively simple in construction so as to be economical to manufacture and convenient and easy to operate and maintain.

The present invention provides television picture image projecting apparatus comprising a housing adapted to be operatively connected to a television receiver and having an image entrance opening at one end of the housing and adjacent the receiver screen, a lens such as a Fresnel type lens in the housing for enlarging the image received from the television screen, and a mirror combination in the housing including two plane mirrors joined with the reflecting surfaces thereof defining an included angle of ninety degrees for inverting a received image.

The mirror combination is located optically between the lens and an image exit opening adjacent the other end of the housing. The resulting image is projected on a generally planar viewing surface such as a standard viewing screen in a forward projection mode. In another aspect thereof, a plane reflecting mirror is located optically between the lens and mirror combination, and the resulting image is projected on one surface of a translucent surface for viewing from the opposite surface in a rear projection mode. In another aspect thereof, a plane reflecting mirror is located optically between the television screen and the lens, and the resulting image is projected on a viewing surface in a forward projection mode.

The foregoing and additional advantages and characterizing features of the present invention will become clearly apparent upon a reading of the ensuing detailed description wherein:

DETAILED DESCRIPTION OF THE ILLUSTRATED EMBODIMENTS

Referring now to FIGS. 1-5, a television projector of the present invention generally designated 10 is shown operatively connected to a standard television receiver 12 having a screen 14 for projecting the television picture image onto a generally planar viewing medium such as a standard projector viewing screen 16. The projecting apparatus comprises an elongated housing having a longitudinal axis and having an entrance opening 18 at one end of the housing for receiving the optical image to be projected. The entrance opening 18 is disposed in a plane generally perpendicular to the longitudinal axis of the housing.

Figure 1:
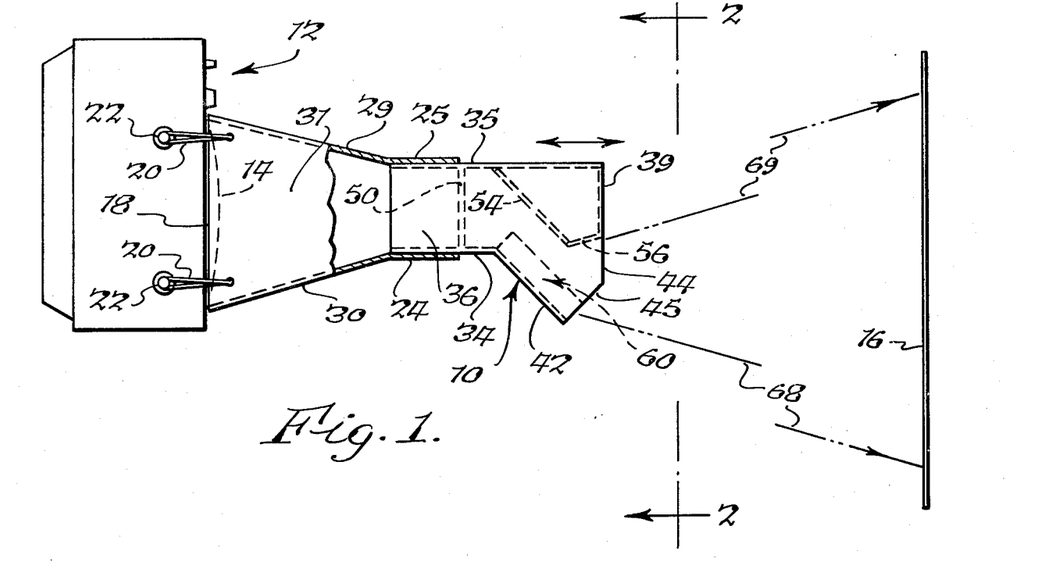
FIG. 1 is a plan view, partly diagrammatic and with a portion in section, illustrating television projector apparatus according to the present invention as it would appear in use.
Figure 2:
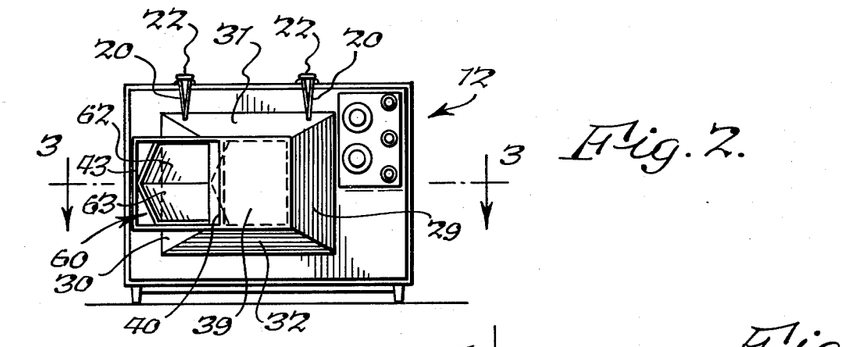
FIG. 2 is an end elevational view taken about on line 2—2 of FIG. 1.

The housing is adapted to be operatively connected to television receiver 12 with entrance opening 18 adjacent the receiver screen 14 and the housing longitudinal axis generally perpendicular to the image plane of screen 14. When the apparatus 10 is in a position of use connected to a television receiver, the housing longitudinal axis normally is horizontal. The projector 10 is removably attached to receiver 12 by spaced cords 20 extending from the housing near the end containing opening 18 and which are looped around suction cup elements 22 fixed to the receiver housing, in particular spaced on the top surface thereof.

The housing can be of any desired material, for example plastic, and includes a fixed portion which is removably attached to receiver 12 by the cords 20 and cups 22 described above and an adjustably movable portion which is carried by the fixed portion. In particular, the fixed portion includes a hollow rectangular section having spaced apart generally parallel side walls 24, 25 which are joined by generally parallel top and bottom walls disposed perpendicular to the side walls. The fixed portion of the housing also includes a generally trapezoidal section defined by outwardly flared side walls 29, 30 and outwardly flared top and bottom walls 31 and 32, respectively. Each of the walls 29–32 is disposed at an angle of about 15° with respect to the housing longitudinal axis. The trapezoidal section meets the hollow rectangular section at one end and the walls 29–32 thereof terminate at the opposite end defining the opening 18. The movable portion of the housing includes a hollow rectangular section having spaced apart generally parallel side walls 34, 35 which are joined by generally top and bottom walls 36 and 37, respectively. The outer perimeter of this hollow rectangular section is slightly smaller than the inner perimeter of the hollow rectangular section including side walls 24, 25 so that the former fits within the latter in a relatively snug-fitting but slidably movable relationship.

Figure 3:
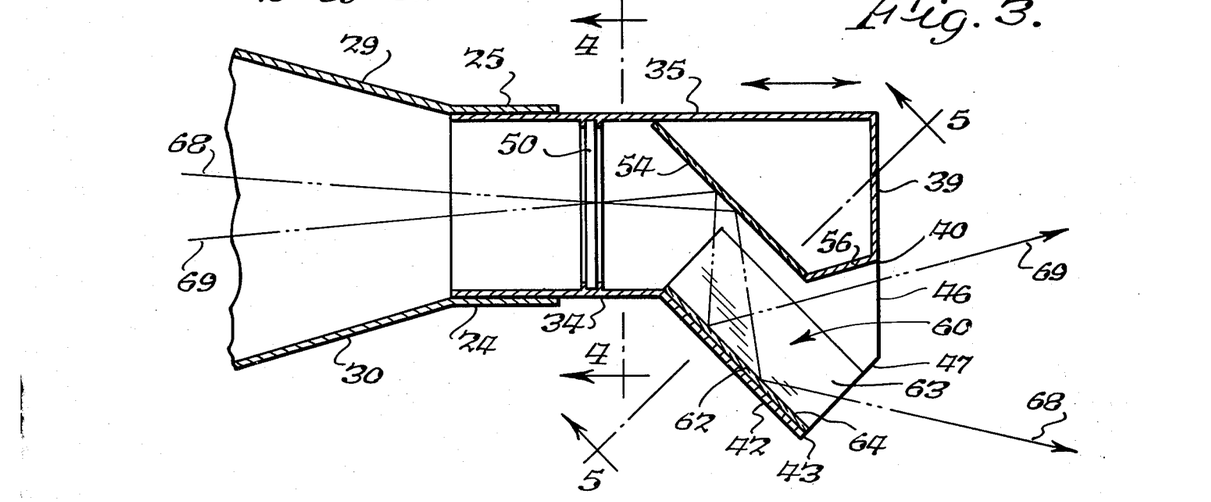
FIG. 3 is a fragmentary sectional view taken about on line 3—3 of FIG. 2.

One side wall, in particular wall 35, extends along the entire length of the movable housing portion and meets an outer end wall 39 which is disposed generally perpendicular to the longitudinal axis of the housing. The end wall 39 terminates in an edge 40 defining part of an exit opening through which the image leaves the apparatus 10 for projecting onto the screen 16. The other side wall 34 extends along approximately one-half the axial length of the movable housing portion where it meets one end of an outwardly disposed side wall section 42 which terminates in an edge 43 defining another part of the image exit opening. The wall section 42 is disposed at an angle of 45° with respect to the longitudinal axis of the housing. The top wall 36 of the housing movable portion terminates in a first edge 44 disposed perpendicular to sidewall 35 and a second edge 45 disposed perpendicular to sidewall section 42, the two edges 44, 45 meeting at a point. Similarly, the bottom wall 37 terminates in a first edge 46 disposed perpendicular to sidewall 35 and a second edge 47 disposed perpendicular to section 42, the two edges 46, 47 meeting at a point. The edges 44, 45 and 46, 47 define the rest of the image exit opening. The exit opening is disposed in a plane which defines an acute included angle with the housing longitudinal axis. The interior surfaces of the housing are white-colored to enhance reflectivity.

Figure 4:
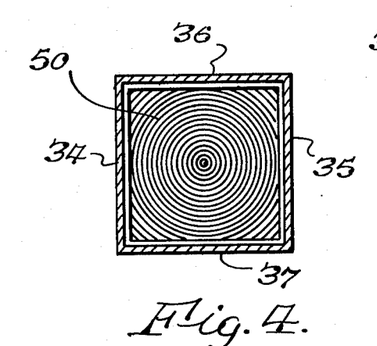
FIG. 4 is a sectional view taken about on line 4—4 of FIG. 3.

The apparatus of the present invention further comprises a lens 50 supported in the housing and disposed in a plane generally perpendicular to the housing longitudinal axis. The center of lens 50 is coincident with the housing longitudinal axis. In other words, the central axis of lens 50, which is a line passing through the center and perpendicular to the focal plane or image plane, is coincident with the housing longitudinal axis. Lens 50 functions to receive an optical image from the entrance opening 18 and to convert the received image into an enlarged, inverted and reversed image. By inverted it is meant that the image plane is rotated about a horizontal axis, as viewed in FIG. 1, through an angle of 180°, and by reversed it is meant that the image plane is rotated about a vertical axis, as viewed in FIG. 1, through an angle of 180°. Lens 50 is located in the housing movable portion within the walls 34–37, and can be held firmly in place by various suitable means such as a track or groove defined by parallel inwardly extending ridge-like elements which receives the peripheral edge portion of lens 50 which can be cemented in place. In the projecting apparatus shown, lens 50 is of the Fresnel type having the following characteristics: groove spacing of 0.0021 inch, thickness of 0.085 inch, and focal length of 15.44 inches. One form of lens found to perform satisfactory results is an acrylic Fresnel lens manufactured by Fresnel Optics Inc. of Rochester, N.Y. under catalog number 204. Another suitable lens is that manufactured by Bausch & Lomb under catalog No. 81-33-05 N8794. The size of lens 50 is determined by the picture tube or screen size of the television receiver with which the projector 10 will be used. As shown in FIG. 4, the peripheral shape of Fresnel lens 50 is square, and the size of the lens is expressed in terms of the length of the square. In particular, 10–12 inch television size requires a 4 inch lens; 12–15 inch television size requires a 4½ inch lens; and 15–21 inch television size requires a 5 inch lens.

Figure 5:
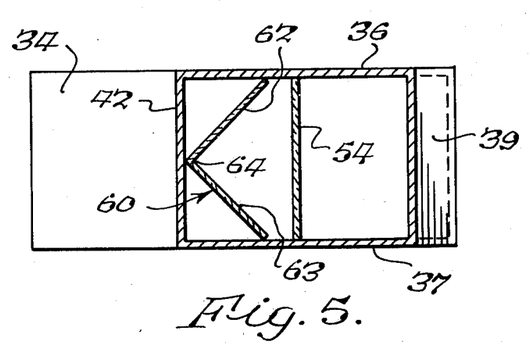
FIG. 5 is a sectional view taken about on line 5—5 of FIG. 3.

In the apparatus shown in FIGS. 1–5 a plane reflecting mirror 54 having a high silver coating is supported in the housing between lens 50 and the end of the housing containing the image exit opening. Mirror 54 is positioned with the reflecting surface inclined toward lens 50, in particular the mirror lies in a plane which is disposed perpendicular to the longitudinal axis of the housing and is inclined to define an included angle of 45° with the longitudinal axis. Mirror 54 is supported in the movable portion of the housing by a structural member 56 extending inwardly from outer end wall 39 and secured to one edge of the mirror. The opposite edge of mirror 54 can be secured by suitable means to the inner surface of side wall 35. In addition, a supporting frame can be employed for mirror 54. In the projecting apparatus shown, mirror 54 is disposed generally parallel to wall portion 42. The length of mirror 54 is such that it extends across substantially the entire width of the housing portion containing the lens 50. The width or height or mirror 54 is equal to the height of the housing portion containing lens 50 and the edges of mirror contact the inner surfaces of the housing top and bottom walls 36 and 37 as shown in FIG. 5.

The apparatus of the present invention further comprises a mirror combination generally designated 60 including two plane reflecting mirror elements 62, 63 joined along an edge of each mirror defining a juncture 64 or straight-line intersection. Mirrors 62, 63 are of the high quality double silver coated type having a thickness of about 0.099 inch as commercially available from Pittsburg Plate Glass Company. The juncture 64 is disposed in each plane of the reflecting surfaces of the mirrors 62, 63. The mirrors are disposed so that the reflecting surfaces define an included angle of 90°. In the apparatus shown, the reflecting surfaces are the first surfaced or first frosted sides. The mirror combination 60 is located optically between lens 50 and the image exit opening of the housing with the reflecting surfaces of the mirrors 62, 63 being disposed to receive an image from lens 50 and reflect an image toward the housing exit opening. The straight line juncture 64 lies in a plane which also contains the housing longitudinal axis and which plane is perpendicular to the plane of lens 50. Juncture 64 is disposed along a line which intersects the housing longitudinal axis at an included angle of 45°. The mirror combination functions to invert the received image and project the image onto a viewing surface such as screen 16.

In the projecting apparatus shown in FIGS. 1–5, the mirror combination is positioned so that the reflecting surfaces of mirrors 62, 63 are disposed toward mirror 54 and the image exit opening in the housing in a manner such that the mirror combination 60 receives an image from mirror 54 and inverts and projects the image through the housing image exit opening. In particular, the straight line juncture 64 of mirror combination 60 is disposed parallel to the plane of mirror 54 and the reflecting surfaces of mirrors 62, 63 face toward the reflecting surface of mirror 54. About one-half the length of mirror combination 60 is in registry, i.e., located directly opposite of, a portion of mirror 54, and the remainder of the mirror combination is in registry with the exit opening. The edge opposite juncture 64 along the other surface of mirror combination 60 contacts the inner surface of wall portion 42 and may be fixed thereto by suitable means. In the projecting apparatus shown, the length of mirror combination 60 is equal to the length of wall portion 42. The outer edges of the mirrors 62 and 63 contact the inner surfaces of the top and bottom walls 36 and 37, respectively, of the housing movable portion. The mirror edges can be fixed to these surfaces by suitable means. Alternatively, a bracket or frame can be employed for supporting the mirror combination 60 in the housing.

The projecting apparatus of FIGs. 1-5 operates in the following manner. Projector 10 is installed in a position of use on television receiver 12 as illustrated in FIGS. 1 and 2 by suitable means such as cords 20 and suction cups 22 as previously described. Projector 10 and receiver 12 are disposed such that the image exit opening adjacent the end of the projector housing remote from receiver screen 14 is facing the generally planar viewing medium 16. The distance from medium 16 to the projector and television receiver can be varied depending, among other things, upon the size of the surface 16, and projector 10 when positioned on receiver 12 will be elevated, preferably at least three feet, relative to the floor or similar surface supporting television receiver 12 and viewing surface 16.

The apparatus of FIGS. 1-5 operates in a forward projection mode which means that the image projected on one surface of medium 16 is viewed by an observer facing that same surface on which the image is incident. It is desirable that the room containing viewing medium 16 be darkened. A preferred form of viewing medium 16 is a glass bead, high gain quality screen such as a home movie screen. Typically, screen 16 will be vertically disposed and the longitudinal axis of the projector housing will be substantially horizontal. The projecting apparatus will operate with other dispositions of screen 16 with appropriate adjustment in the orientation of receiver 12 and projector 10.

The optical image from television receiver screen 14 enters projector 10 through opening 18, and the image is magnified or enlarged, inverted and reversed by lens 50. In relation to the horizontally disposed longitudinal axis of the housing in the position of use illustrated in FIGS. 1 and 2, the term inverted as used herein means that the image is rotated about a horizontal axis. The term reversed as used herein means that the image is rotated about a vertical axis. The image from lens 50 is incident on mirror 54 and is reversed upon reflection toward mirror combination 60. The image from plane mirror 54 is incident on the mirror combination 60 and is inverted and reflected toward the image exit opening. The image from mirror combination 60 leaves the apparatus through the image exit opening and is projected upon the surface 16. The foregoing is illustrated diagrammatically by the light rays designated 68, 69 in FIGS. 1 and 3. The operation of the mirror combination will be described in further detail presently.

The distance between projector 10 and viewing surface 16 can be varied as desired, and focusing of the projected image is effected by moving the housing portion containing lens 50, mirror 54 and mirror combination 60 relative to the stationary portion of the housing in the direction of arrow 70 shown in FIGS. 1 and 3.

By way of example, in apparatus according to FIGS. 1-5 for use with a television receiver having a 9 inch screen, the length of the fixed housing portion is about 11 inches, opening 18 has a horizontal dimension of 9 inches and a vertical dimension of 7 inches, lens 50 has a diameter of 4½ inches, the horizontal dimension of the movable housing portion along the greatest width is 9 inches, mirror 54 has a length of 6 inches and height of 4½ inches, and mirror combination 60 has a length of 6 inches measured along junction 64 and a height of 4½ inches measured between the outer edges of mirrors 62, 63.

Figures 6, 7:
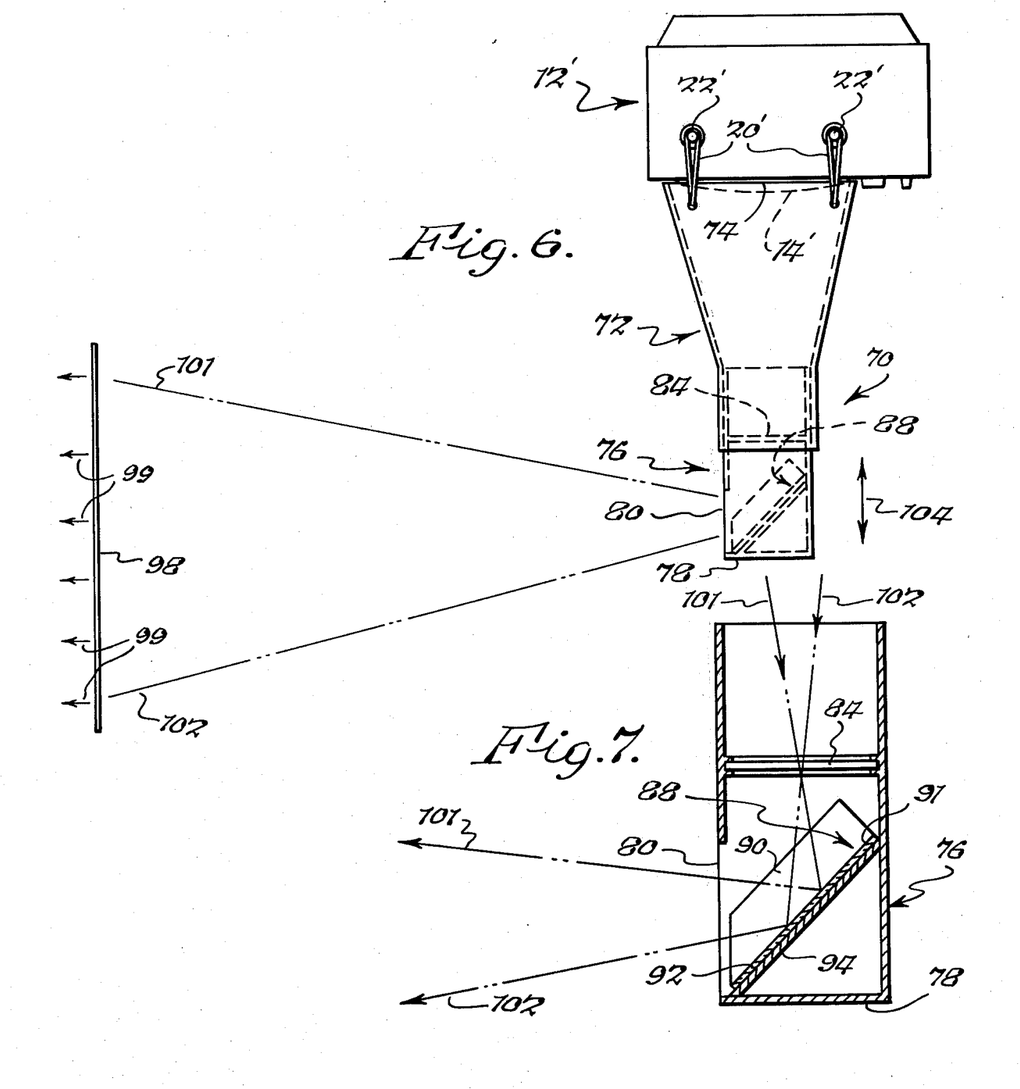
FIG. 6 is a plan view, partly diagrammatic, illustrating television projector apparatus according to another embodiment of the present invention as it would appear in use.
FIG. 7 is a fragmentary horizontal sectional view, partly diagrammatic, of the apparatus of FIG. 6.

FIGS. 6 and 7 illustrate a television projector 70 according to another embodiment of the present invention. Projector 70 is removably attached to a television receiver 12' by cords 20' leading from the projector housing and looped around suction cups 22' fixed to the top surface of receiver 12' in a manner similar to the embodiment of FIGS. 1-5. Television projector 70 includes a fixed housing portion 72 having an image entrance opening 74 surrounding screen 14 of receiver 12. Opening 74 is disposed in a plane perpendicular to the housing longitudinal axis. Housing portion 72 has a shape similar to the fixed housing portion in the projector of FIGS. 1-5. Projector 70 also comprises a movable housing portion 76 which is generally hollow rectangular in shape and snugly, slidably received in the end of housing portion opposite the opening 74. Portion 76 has an open end within the housing portion 72 and has a solid or closed wall surface 78 at the opposite end thereof. End 78 is disposed in a plane perpendicular to the longitudinal axis of housing portions 72 and 76. An image exit opening 80 is provided in one of the housing side walls adjacent end 78, the opening 80 being disposed in a plane parallel to the longitudinal axis of the projector housing.

A lens 84 in the form of a Fresnel lens similar to lens 50 in the apparatus of FIGS. 1-5 is supported in the housing, in particular in the movable portion 76, and is disposed in a plane generally perpendicular to the housing longitudinal axis. The center of lens 84 is coincident with the housing longitudinal axis. Lens 84 is located between image entrance opening 74 and the housing end 78 and image exit opening 80. In the projector shown, lens 84 is held firmly in place by a track or groove defined by ridge-like elements extending inwardly from the housing walls and which receives the peripheral edge of lens 84 which can be cemented or otherwise fastened in place. Lens 84 can have the same optical characteristics as lens 50 in the embodiment of FIGS. 1-5, and the same relationships apply as to lens size relative to television receiver picture tube or screen size.

A mirror combination 88 is located in housing portion 76 between lens 84 and opening 80 and is similar to mirror combination 60 in the embodiment of FIGS. 1-5. In particular, mirror combination 88 includes two plane reflecting mirror elements 90, 91 joined along an edge of each mirror defining a juncture 92 or straight line intersection. Mirror combination 88 can be supported in housing portion 76 in various suitable ways, and in the projector shown, an interior supporting wall portion 94 is fixed at opposite ends to end wall 78 and to the side wall opposite opening 80. The juncture 92 is disposed in each plane of the reflecting surfaces of the mirrors 91, 92, and the mirrors are disposed so that the reflecting surfaces define an included angle of 90°. The mirror combination 88 is located optically between lens 84 and image exit opening 80 of the housing with the reflecting surfaces of the mirrors 90, 91 being disposed to receive an image from lens 84 and reflect an image toward the housing exit opening 80. The straight line junction 92 of the mirror elements 90, 91 lies in a plane which also contains the housing longitudinal axis, which plane defines an included angle of 45° with the plane of lens 84, and which plane defines an included angle of 45° with the plane of opening 80. Thus, the mirror combination 88 is positioned so that the reflecting surfaces of mirrors 90, 91 are disposed toward lens 84 and toward opening 80 in a manner such that the combination 88 receives an image from lens 84 and inverts and projects the image through the image exit opening 80. In considering the image exit opening 80 and housing end wall 78 as defining adjacent sides of a rectangle which is completed by the opposite counterparts of opening 80 and wall 78, mirror combination 88 is of a length such that juncture 92 defines a diagonal of such rectangle. The distance between juncture 92 and the center of lens 84 measured along the housing longitudinal axis should equal the size of lens 84. The height of mirror combination 88, i.e., distance between outer edges of mirrors 90, 91 should be equal to the size of lens 84. The ends of mirrors 90, 91 adjacent opening 80 define an included angle of 45° with juncture 92 so that this end of the mirror combination does not extend outwardly of the housing.

The apparatus of FIGS. 6 and 7 operates in the following manner. Projector 70 is installed in a position of use on television receiver 12' in a manner similar to the installation of projector 10 on receiver 12. Projector 70 and receiver 12' are disposed such that the image exit opening 80 is facing a generally planar viewing medium 98, i.e., the planes of opening 80 and medium 98 are substantially parallel. The distance from medium 98 to the projector and television receiver can be varied depending, among other things, upon the size of medium 98, and when positioned on receiver 12' projector 70 will be elevated, preferably at least three feet, relative to the floor or similar surface supporting television receiver 12' and viewing medium 98.

The apparatus of FIGS. 6 and 7 operates in a rear projection mode which means that the image projected on one surface of medium 98 is viewed by an observer facing a surface thereof opposite the surface on which the image is incident. In particular, the right-hand surface of medium 98 as viewed in FIG. 6 receives the projected image, and an observer facing the left-hand surface of medium 98 views the image provided by light rays traveling in the direction indicated by arrows 99. One form of viewing medium 98 found to perform satisfactorily is a screen of rigid acrylic plastic material having a thickness in the range of 1/16 inch to ⅛ inch with a frosted optical coating on one surface thereof, such screen being commercially available from the Da-Lite Corporation. It is desirable that the room containing viewing medium or screen 98 be dimly lighted. Typically, screen 98 will be disposed vertically and the longitudinal axis of the projector housing will be substantially horizontal. The projecting apparatus will operate with other dispositions of screen 98 with appropriate adjustment in the orientation of receiver 12' and projector 70.

The optical image from television receiver screen 14' enters projector 70 through opening 74, and the image is magnified or enlarged, inverted and reversed by lens 84. The terms inverted and reversed are used in the same way as those terms apply to the embodiment of FIGS. 1–5. The image from lens 50 is incident on the mirror combination 88 and is inverted and reflected toward image exit opening 80. The image from mirror combination 88 leaves the apparatus through image exit opening 80 and is projected on the viewing medium 98. The foregoing is illustrated diagrammatically by the light rays designated 101, 102 in FIGS. 6 and 7.

The distance between projector 70 and viewing medium 98 can be varied as desired, and focusing of the projected image is effected by moving the housing portion 76 relative to housing portion 72 in the direction of arrow 104 shown in FIGS. 6 and 7.

Figure 8:
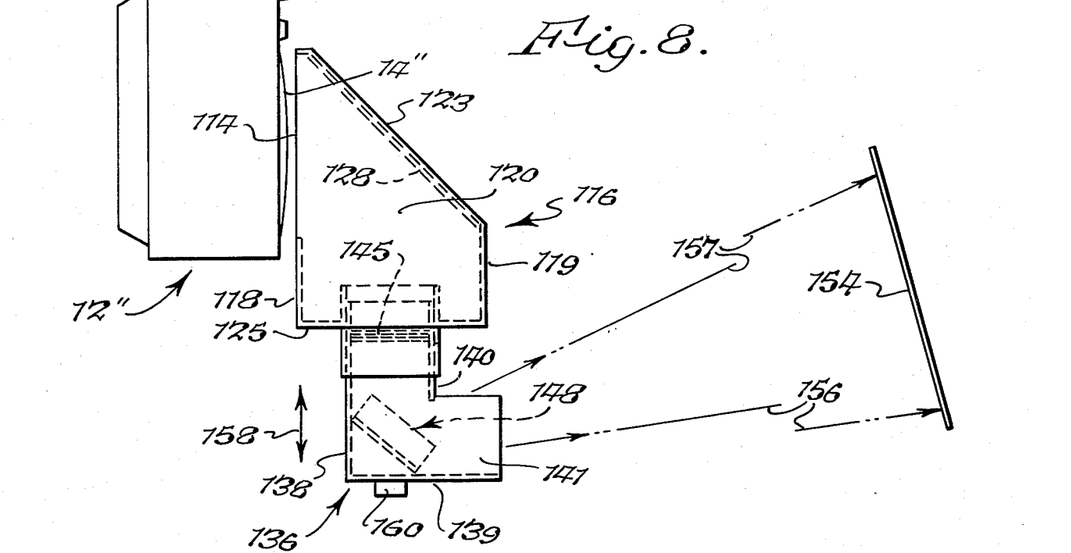
FIG. 8 is a plan view, partly diagrammatic, illustrating television projector apparatus according to another embodiment of the present invention as it would appear in use.
Figure 9:
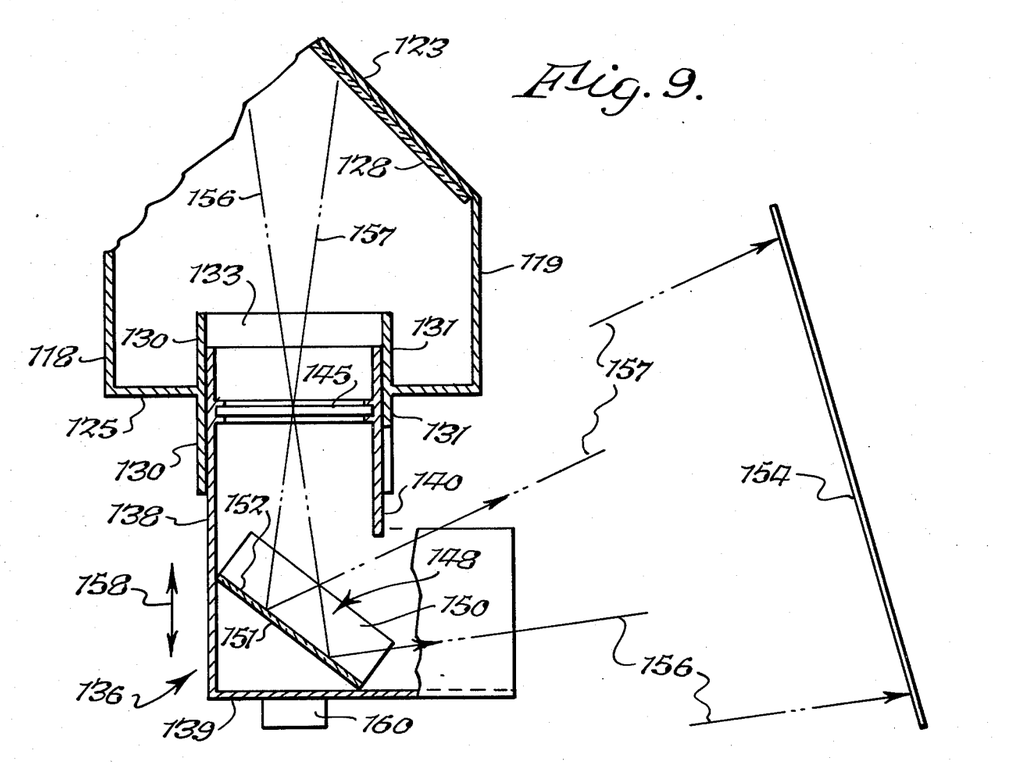
FIG. 9 is a fragmentary horizontal sectional view, partly diagrammatic, of the apparatus of FIG. 8.
Figure 10:
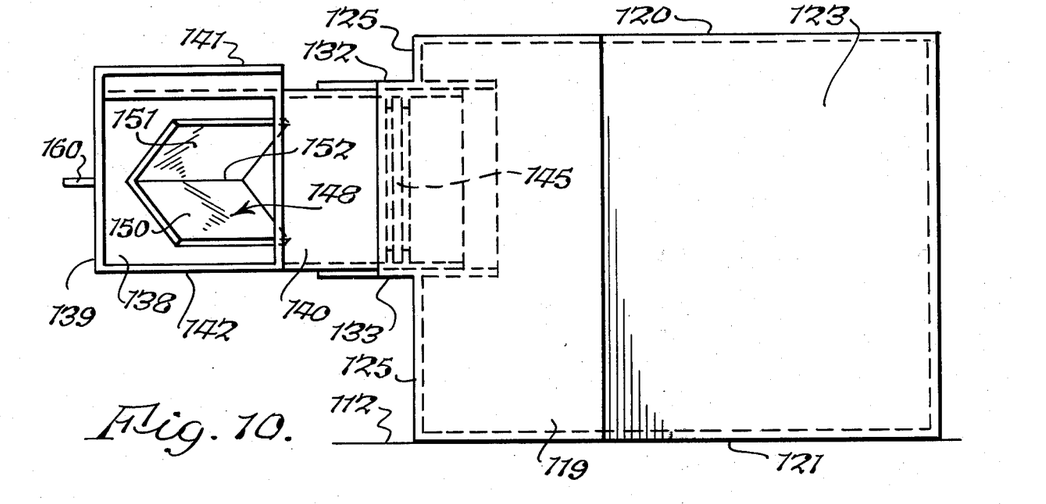
FIG. 10 is an elevational view of the apparatus of FIG. 8.

FIGS. 8–10 illustrate a television projector 110 according to another embodiment of the present invention. Projector 110 is adapted to be operatively associated with a conventional television receiver 12' having a screen 14". Projector 110 is not attached to receiver 12' but is of the free standing type of which rests on the floor or supporting surface 112 which also supports receiver 12". Projector 110 comprises an elongated housing having a longitudinal axis and having an image entrance opening 114 disposed in a plane parallel to the housing longitudinal axis and adapted to register with receiver screen 14". The housing includes a fixed portion 116 containing opening 114 and defined by spaced-apart parallel side walls 118, 119 which are joined by spaced apart and parallel top and bottom walls 120 and 121, respectively. Side wall 118 contains opening 114 and is of greater length than wall 119, and the housing is closed at one end by an end wall 123 which in the present apparatus is disposed at an angle of 45° to the housing longitudinal axis. The opposite end wall 125 of housing portion 116 is disposed perpendicular the the housing longitudinal axis. A plane reflecting mirror 128 is fixed to the inner surface of end wall 123 and the reflecting surface thereof defines an included angle of 45° with the plane of image entrance opening 114.

An opening is defined in end wall 125 by spaced-apart parallel side wall elements 130, 131 and spaced-apart top and bottom wall elements 132, 133, and all the wall elements 130–133 are disposed in planes perpendicular to wall 125 and parallel to the housing longitudinal axis. The size of the opening defined by walls 130–133 is less than the area of end wall 125. The housing further comprises a movable portion 136 which is generally L-shaped and includes an image exit opening laterally offset from the housing longitudinal axis. The image exit opening is disposed in a place which defines with the housing longitudinal axis an included angle of less than 90°. Portion 136 is defined by side walls 138, 139 which meet at a right angle, a relatively shorter side wall 140 which is parallel to side wall 138 and generally L-shaped top and bottom wall portions 141 and 142, respectively. The section of housing portion 136 including walls 138, 140 and the corresponding parts of the top and bottom walls 141 and 142 is snugly but slidably received in the opening defined by wall sections 130–133. The end of housing portion 136 extends into the opening in fixed portion 116 by a sufficient amount and the fit is sufficiently snug so that portion 136 is supported by portion 116.

A lens 145 in the form of a Fresnel lens similar to the lenses in the preceding embodiments is supported in the housing, in particular in the movable portion 136, and is disposed in a plane generally perpendicular to the housing longitudinal axis. The center of lens 145 is coincident with the housing longitudinal axis. Lens 145 is located between mirror 128 and wall 139 of the housing movable portion 136. In the projector shown, lens 145 is held firmly in place by a track or groove defined by ridge-like elements extending inwardly from walls 130-133 which receives the peripheral edge of lens 145 which can be cemented or otherwise fastened in place. Lens 145 can have the same optical characteristics as the lenses in the preceding embodiments, and the same relationships apply as to lens size relative to television picture tube or screen size.

A mirror combination 148 is located in housing portion 136 between lens 145 and the image exit opening, and it is similar to the mirror combinations in the preceding embodiments. In particular, mirror combination 148 includes two plane reflecting mirror elements 150, 151 joined along an edge of each mirror defining a juncture 152 or straight line intersection. Mirror combination 148 can be supported in housing portion 136 by various suitable means, for example a supporting frame. The juncture 152 is disposed in each plane of the reflecting surfaces of the mirrors 150, 151 and the mirrors are disposed so that the reflecting surfaces define an included angle of 90°. The mirror combination 148 is located optically between lens 145 and the image exit opening of the housing, with the reflecting surfaces of the mirrors 150, 151 being disposed to receive an image from lens 145 and reflect an image toward the image exit opening of the housing. The straight line juncture 152 of the mirror elements 150, 151 lies in a plane which also contains the housing longitudinal axis, and which plane defines an included angle of about 37.5° with the housing longitudinal axis. Thus, the mirror combination 148 is positioned so that the reflecting surface of mirrors 150, 151 are disposed toward lens 145 and toward the housing image exit opening in a manner such that the combination 148 receives an image from lens 145 and inverts and projects the image through the exit opening. The mirror combination 148 is of sufficient length so that it extends across the entire lateral dimension of housing portion 136.

The apparatus of FIGS. 8-10 operates in the following manner. Projector 110 is located adjacent receiver 12" with opening 114 in registry with receiver screen 14". Projector 110 and receiver 12" are disposed such that the image exit opening of the projector housing is facing a generally planar viewing medium 154. The distance from medium 154 to the projector and television receiver can be adjusted depending, among other things, upon the size of medium 154.

The apparatus of FIGS. 8-10 operates in a forward projection mode similar to the apparatus of FIGS. 1-5. Accordingly, medium 154 can be in the form of a screen similar to screen 16. It is desirable that the room containing screen 154 be darkened. Typically, screen 154 will be disposed vertically and the longitudinal axis of the projector housing will be substantially horizontal. The projecting apparatus will operate with other dispositions of screen 154 with appropriate adjustment in the orientation of receiver 12" and projector 110.

The optical image from television receiver screen 14" enters projector 110 through opening 114, and the image is reversed and reflected by mirror 128. The image from mirror 128 is received by lens 145 and the image is magnified or enlarged, inverted and reversed by lens 145. The terms inverted and reversed are used in the same way as those terms apply to the preceding embodiments. The image from lens 145 is incident on mirror combination 148 and is inverted and reflected toward the image exit opening. The image from mirror combination 148 leaves the apparatus through the image exit opening and is projected on the viewing medium 154. The foregoing is illustrated diagrammatically by the light rays designated 156, 157 in FIGS. 8 and 9.

The distance between projector 110 and screen 154 can be varied as desired, and focusing of the projected image is effected by moving the housing portion 136 relative to housing portion 116 in the direction of arrow 158 in FIGS. 8 and 9. A handle 160 is provided to facilitate focusing.

By way of example, a television projector 110 for use with television receivers varying in size from 9 to 17 inch diagonal and which projects an image ranging in size from about 30 inch diagonal to 7 feet diagonal will have a fixed or hood portion 116 of the following dimensions: side wall 118 a length of 1 foot 6 inches, side wall 119 a length of 7 inches, a width measured between side walls 118, 119 of 11 inches and a height measured between top and bottom walls 120, 121 of 1 foot, 1 ⅛ inches. Mirror 128 can have dimensions of 13 inches by 12 ½ inches with thickness of 3/32 inch, and lens 145 can be identical to lens 50 in the embodiment of FIGS. 1-5 and 6 inches in size. The wide angle side of lens 145 faces mirror 128. The length of housing movable portion 136 measured between wall 139 and the end within portion 116 is about 1 foot and the section containing lens 145 will be about 6 inches square. The distance between the end of housing portion 136 within hood 116 and lens 145 is 3 ⅝ inches, and the distance between lens 145 and mirror juncture 152 measured along the housing longitudinal axis is 5 ⅝ inches.

The preferred viewing area for persons using the apparatus of FIGS. 8-10 is in the area to the right of projector 110 and screen 154 as viewed in the plan view of FIG. 8. With this preferred viewing area, the fact that mirror combination 148 is disposed with juncture 152 at an included angle of 37.5° to the housing longitudinal axis gives several important results. It has been determined that a better viewing angle is provided on screen 154 with mirror combination 148 so disposed as compared with having juncture 152 at an included angle of 45° to the housing longitudinal axis. In addition, the combination of the foregoing preferred viewing area and disposition of mirror combination at 37.5° has been found to create a sound feedback effect giving a viewer in the preferred area the illusion that sound emanates from the image on screen 154.

Figure 11:
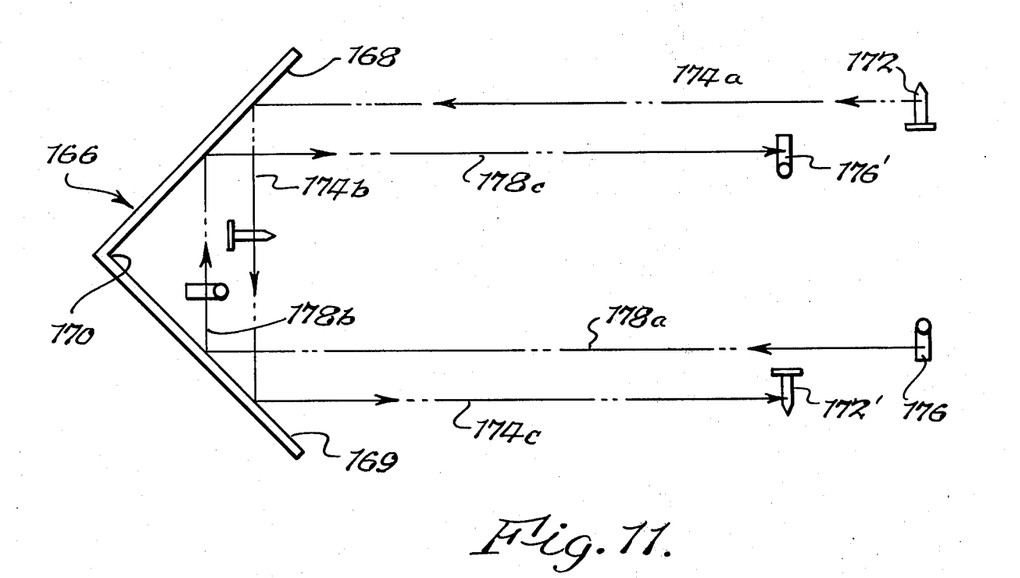
FIG. 11 is a diagrammatic view illustrating the operation of the minor combination of the apparatus of the present invention.

FIG. 11 is a diagrammatic view further illustrating the operation of the mirror combination in the projector of the present invention. A mirror combination 166 comprises two plane mirror elements 168, 169 joined along an edge of each mirror defining a juncture or straight line intersection 170. The juncture 170 is disposed in each plane of the reflecting surfaces of the mirrors 168, 169, and the mirrors are disposed so that the reflecting surfaces define an included angle of 90°. Mirror combination 166 is identical to each of the mirror combinations 60, 88 and 148 previously described. As shown in FIG. 11, an object 172 facing the reflecting surfaces of mirrors 168, 169 and offset from juncture 170 toward mirror 168 sends light rays such as ray 174a toward the reflecting surface of mirror 168 which reflects the ray 174b to mirror 169 which reflects the ray 174c to form an inverted image 172' of the object. Similarly, an object 176 facing the reflecting surfaces of mirrors 168, 169 and offset from juncture 170 toward mirror 169 send light rays such as ray 178a toward the reflecting surface of mirror 169 which reflects the ray 178b to mirror 168 which reflects the ray 178c to form an inverted image 176' of the object.

It is therefore apparent that the present invention accomplishes its intended objects. The projector of the present invention can be used with television receivers of various sizes and of both black and white and color type. The apparatus converts the television image into a projected image of high quality, and various forms of the apparatus provide forward and rear projection modes. The mirror combination and single Fresnel lens enables high quality projection to be provided by apparatus which is relatively simple in construction. The housing is of relatively small size and of light weight material rendering the apparatus convenient and easy to install on a standard television receiver and readily removable therefrom.

While several embodiments of the present invention have been described in detail, this is done for purposes of illustration, not limitation.

I claim:

1. Apparatus for projecting an optical image from the screen of a television receiver onto a generally planar viewing medium spaced therefrom comprising:
   (a) an elongated housing having a longitudinal axis; an entrance opening at one end of said housing for receiving the optical image to be projected, and an exit opening adjacent the other end of said housing through which the image leaves for projecting onto the viewing medium, said housing adapted to be operatively associated with a television receiver with said entrance opening adjacent the screen of said receiver, said exit opening facing said viewing medium, and said housing longitudinal axis disposed in a plane generally perpendicular to the plane of the receiver screen;
   (b) a lens supported in said housing and disposed in a plane generally perpendicular to said housing longitudinal axis, the center of said lens being substantially coincident with said housing longitudinal axis, said lens receiving an optical image from said entrance opening and converting said image into an enlarged, inverted and reversed image; and
   (c) a mirror combination including two plane reflecting mirror elements joined along an edge of each mirror defining a straight intersection, said intersection being disposed in each plane of the reflecting surfaces of said mirrors, said intersection being disposed in a plane containing said housing longitudinal axis, the reflecting surfaces of said mirrors being disposed to define an included angle of 90°, said mirror combination being located optically between said lens and said housing exit opening with said reflecting surfaces being disposed to receive an image toward said opening, said mirror combination inverting the received image and projecting the image onto the viewing medium.

2. Apparatus according to claim 1, wherein said entrance opening is disposed in a plane substantially perpendicular to said longitudinal axis, said exit opening is disposed in a plane substantially parallel to said longitudinal axis, and said straight intersection of said mirror combination lies in a plane which defines an included angle of substantially 45° with the plane of said lens and an included angle of substantially 45° with the plane of said lens and an included angle of substantially 45° with the plane of said exit opening.

3. Apparatus according to claim 1, wherein said entrance opening is disposed in a plane substantially perpendicular to said longitudinal axis, said exit opening is disposed in a plane which defines with said longitudinal axis an included angle of less than 90°, said mirror combination is disposed with said reflecting surfaces facing said exit opening and said straight line intersection defines with said longitudinal axis an included angle of substantially 45°, and further including a plane reflecting mirror optically between said lens and said mirror combination, the reflecting surface of said plane mirror facing said lens and the reflecting surfaces of said mirror combination, said plane mirror intersecting said housing longitudinal axis at an included angle of substantially 45°.

4. Apparatus according to claim 1, wherein said entrance opening is disposed in a plane substantially parallel to said longitudinal axis, said exit opening is disposed in a plane which defines with said longitudinal axis an included angle of less than 90°, said mirror combination being disposed with said reflecting surfaces facing said lens and said exit opening, and further including a plane reflecting mirror optically between said entrance opening and said lens, said plane mirror being disposed in a plane defining with said housing longitudinal axis an included angle of substantially 45° and with the reflecting surface thereof facing said entrance opening and said lens.

5. Apparatus according to claim 4, wherein said mirror combination is disposed with said straight intersection defining with said housing longitudinal axis an included angle of 37.5°.

6. Apparatus according to claim 1, wherein said lens comprises a Fresnel lens.

7. Apparatus according to claim 1, wherein said housing comprises a fixed portion operatively associated with said television receiver and a movable portion carried by said fixed portion, said movable portion containing said lens and said mirror combination, whereby relative movement of said housing portions provides optical focusing of the projected image.

8. Apparatus according to claim 1 further including means for removably attaching said housing to a television receiver with said image entrance opening in registry with the receiver screen.

9. Apparatus according to claim 1 wherein said housing has a base disposed in a plane substantially perpendicular to the plane of said image entrance opening, said base adapted to rest on a supporting surface, whereby said housing is supported adjacent a television receiver with said image entrance opening in registry with the receiver screen.

* * * * *